United States Patent Office 3,028,342
Patented Apr. 3, 1962

3,028,342
CATALYST COMPOSITION
Irving Katz, Long Beach, Giles A. Plew, Rivera, and Jardine C. Wilson, Compton, Calif., assignors to North American Aviation, Inc.
No Drawing. Filed Apr. 2, 1956, Ser. No. 575,364
8 Claims. (Cl. 260—2)

This invention relates to a novel catalyst composition. More particularly, this invention relates to an amide-amine catalyst composition which can be employed with resinous compounds to provide room-temperature stable resin compositions.

Epoxy resin compounds, sometimes known as ethoxyline compounds, have been found to be valuable coating compositions. These compounds are complex epoxide resins, comprising polyether derivatives of polyhydric alcohols containing more than one epoxy group per molecule. Various modifications of these epoxy resins have been used as, for example, the combination of epoxy resins and acrylic polyester compounds. Such resin coating compositions have been used in varnishes, enamels and also as insulating materials for electrical wire and apparatus. When used as insulation for electrical equipment, it is necessary to add catalysts in order to obtain polymerization. Amines such as triethylamine have been found useful for this purpose. When the catalyst is added, however, polymerization takes place even at room temperature so that a cured resin composition can be obtained without heating. This, however, has the the great disadvantage that the catalyzed resin composition must be used as soon as it is made up. Often the resin starts to set up before it can be properly applied for the intended use. For example, in the insulation of coiled electrical copper wire in various electrical devices, it is necessary to immerse the electrical device in the resin and have the latter penetrate all the spaces between the closely wound wires in order to form a protective coating upon being cured. The amine catalyzed resin, however, tends to increase in viscosity from the moment of compounding so that in the short while it becomes too viscous to penetrate the small spaces in between the strands of coiled wire. As a result, a considerable area of the wire is void of insulation and arcing and breakdowns occur long before any high voltages are reached. Thus it is seen that a need exists for a catalyzed resin composition, suitable for use in electrical insulation application, which has a good viscosity stability for prolonged periods.

It is therefore an object of the present invention to provide a novel curing composition. Another object is to provide a curing composition which is stable at room temperatures. It is also an object of this invention to provide a curing composition for epoxy polyether type resins. Another object of this invention is to provide a curing agent containing resin composition which is readily cured at elevated temperatures. Another object is to provide catalyzed ethoxyline type resins having low viscosities for prolonged periods of time prior to curing. Another object of this invention is to provide a heat-resistant resin composition. It is also an object to provide a stable resin composition containing a normally solid and sparingly soluble curing component. It is likewise an object of this invention to provide resins having improved impact strength. Still another object of this invention is to provide compositions having high electrical insulating qualities. It is also an object of this invention to provide electrical wire and devices insulated with novel resin compositions capable of resisting high electrical potential breakdowns. Another object is to provide a process for insulating electrical devices with low-viscosity, low-temperature-stable, thermo-setting resins so as to produce units which will not break down under high potential. Other objects will become apparent from the discussion that follows.

The above and other objects are accomplished by a polymerization curing composition comprising (1) an amide of a monocarboxy organic acid, having from 1 to about 15 carbon atoms and 1 nitrogen atom and (2) a carbon, hydrogen and nitrogen-containing amine, having from 2 to about 24 carbon atoms, from 1 to about 5 nitrogen atoms, and 0 to about 3 oxygen atoms. An illustrative example of the novel curing composition of this invention comprises dimethylformamide and 1-cyanoguanidine. It is found that when such a curing composition is employed, together with an epoxy resin, the mixture remains stable for long periods of time and is readily cured at temperatures of from about 93° C. to about 150° C. to form a rigid plastic composition of high electrical insulation quality.

The ratio of the amounts of amide-to-amine in parts by weight which can be employed in our curing composition can vary from about 16:1 to about 1:3. It is found that when an amide-amine composition within these limits is employed as the curing composition for ethoxyline resins, satisfactory room-temperature stability, or pot-life, as well as satisfactory cured products, are obtained.

A preferred ratio in parts by weight of amide-to-amine is from about 11:1 to about 3:1. It is found that when the composition falls within this range of ratios, not only is there a satisfactory period of room-temperature stability, but a plastic is obtained at lower curing temperatures and shorter periods of time. The temperature in this case need not exceed about 120° C. while, for ratios in which still smaller amounts of amine are employed in proportino to the amide used, temperatures of 150° C. and higher are sometimes necessary. A curing composition which gives very good results, for example, is one composed of 7 parts of N,N-dimethylformamide and 1 part of 1-cyanoguanidine. Another example is 11 parts of N,N-dipropylpropionamide and 1 part of tetraethylenepentamine. The amount of curing composition employed varies from about 8 parts to about 53 parts per 100 parts of resin used.

In general, this invention consists of a curing composition comprising (1) an amide having the general formula

wherein Y represents that part of the amide which is derived from an organic carboxy acid, namely,

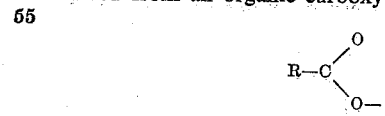

in which R is hydrogen or a hydrocarbon group, and wherein Y has from 1 to about 4 carbon atoms; $R_1$ and $R_2$ can be the same or different and are selected from the group consisting of hydrogen, and hydrocarbon groups having from 1 to about 12 carbon atoms; and wherein the total number of carbon atoms in the —$NR_1R_2$ part of the molecule is from 0 to about 12, and the total number of carbon atoms in the amide molecule is from 1 to about 15; and (2) a carbon, hydrogen, and nitrogen containing amine having from about 2 to about 24 carbon atoms, from 0 to about 3 oxygen atoms, and from 1 to about 5 nitrogen atoms. An example of an amide represented by the formula given above is diethylpropionamide having the formula

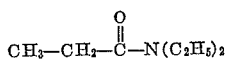

An example of an amine is 1-cyanoguanidine having the formula

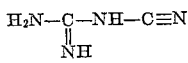

which has 2 carbon atoms and 3 nitrogen atoms.

While the compositions of the components (1) and (2), as stated in the previous paragraph, were found to be satisfactory for the purpose of compounding the present resin catalysts, it is, however, preferred that in the general formula

Y represents that part of the amide which is derived from an organic carboxy acid and has from 1 to about 3 carbon atoms; and $R_1$ and $R_2$, which can be the same or different, be selected from the group consisting of hydrogen and hydrocarbon groups having from about 1 to about 6 carbon atoms. In these preferred species, the total number of carbon atoms in the —$NR_1R_2$ part of the molecule is from 1 to about 6, and the total number of carbon atoms in the amide molecule is from about 2 to about 8. It is also preferred that the carbon, hydrogen, and nitrogen containing amine have from 2 to about 18 carbon atoms, from 0 to about 3 oxygen atoms, and from about 1 to about 5 nitrogen atoms. When the catalyst of this invention has this composition it can be mixed with ethoxyline type resins to produce compositions of matter which are stable for suitably long periods of time at room temperature and which form a stable rigid plastic upon curing at elevated temperatures of from about 93° C. to about 120° C.

An especially preferred embodiment of this invention comprises a catalyst composition containing (1) an amide having the general formula

wherein Y represents that part of the amide derived from an organic carboxy acid and having from 1 to 2 carbon atoms; $R_1$ is selected from the group consisting of hydrogen and hydrocarbon groups having from 1 to about 3 carbon atoms; $R_2$ is selected from the group consisting of hydrogen and hydrocarbon groups having from 1 to about 3 carbon atoms; and wherein the total number of carbon atoms in the —$NR_1R_2$ part of the molecule is from 2 to about 6, and the total number of carbon atoms in the amide molecule is from 3 to about 8, and (2) a carbon, hydrogen and nitrogen containing amine having from 2 to about 12 carbon atoms and from 1 to about 5 nitrogen atoms; wherein at least 1 of said nitrogen atoms has 2 hydrogen atoms attached thereto. When curing agents of this composition are employed with resins such as copolymers of polyphenol and epichlorohydrin, compositions are obtained which have especially long stability characteristics at room temperature and, upon curing, produce hard resins. Examples of these preferred amides are N,N-dimethylformamide and N,N-diethylacetamide. Examples of the amines are 1-cyanoguanidine and dodecylenediamine.

Amides which are used in the preparation of the curing compositions of this invention are illustrated by the following examples: formamide, N-methylformamide, N,N-dimethylformamide, N-propylformamide, N,N-dipropylformamide, N,N-dibutylformamide, N,N-ethyloctylformamide, N-phenylformamide, N,N-methylphenylformamide, N-ethyl-N(dimethylphenyl)formamide, N-tolyl-formamide, N-methylacetamide, N,N-dimethylacetamide, N-ethylacetamide, N,N-diethylacetamide, N-phenylacetamide, N-ethylpropionamide, N,N-dimethylpropionamide, N,N-diethylpropionamide, N,N - di - tert. - butylpropionamide, N,N-dicyclohexylformamide, etc.

The amines that can be used in the curing compositions may be primary, secondary, tertiary or a mixture of two or more of them. These amines may be either alkyl, aryl, cycloalkyl, arylkyl, and alkaryl amines. Examples of primary amines are ethylenediamine propylenediamine, butylamine, isopentylamine, hexylamine, dodecylamine, eicosylamine, metaphenylenediamine, 4,4-methylenedianiline. Illustrative examples of secondary amines are N-methylethylamine, diethylamine, N-ethylpropylamine, N-cyclohexylpropylamine, piperidine, N-tert.-butyloctylamine, didodecylamine. Nonlimiting examples of tertiary amines are: N-methyldiethylamine, triethylamine, pyridine, tributylamine, trioctylamine. Nonlimiting examples of mixed amino compounds which are suitable are diethylenetriamine, tetraethylenepentamine, diethylaminopropylamine. Another group of amines that can be used are the substituted guanidines as, for example, 1-cyanoguanidine, 1-cyano-3-ethylguanidine, 1-cyano-3-hexylguanidine, 1-cyano-3,3-dipentylguanidine, etc., the general formula for the cyanoguanidines is

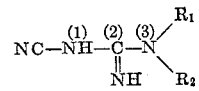

the 1, 2, and 3 positions are indicated in parentheses above the formula. $R_1$ and $R_2$ can be hydrogen or saturated hydrocarbon groups having up to about 5 carbon atoms, and the total number of carbon atoms in the compound can vary from 2 to about 12. Still another group of amines that can be used are hydroxy substituted amines, nonlimiting examples of which are triethanolamine, diethanolamine, N-methylethanolamine, butanolamine, dioctanolamine, etc. Of all the possible amines that can be used it is especially preferred to use amines containing at least one primary amino group. That is, it is preferred to employ an amine in which there is at least one —$NH_2$ group, as for example, 1-cyanoguanidine and dimethylaminopropylamine.

Both the amines and the amides used in the preparation of the curing composition are staple commodities of commerce. Their preparation is well-known to persons familiar with the art. For example, amides are prepared by reacting ammonia with organic acid esters, organic acid anhydrides and organic acid halides, as described in "Textbook of Organic Chemistry" by Fieser and Fieser, published by D. C. Heath and Company, New York, N.Y. The amines are prepared by reacting organohalide compounds with ammonia and by other methods also described by Fieser and Fieser.

In general, the curing compositions of this invention are prepared by adding one or more amines and one or more amides to a suitable container and stirring or agitating by some other appropriate means until this solution becomes homogeneous throughout. It is sometimes found advantageous to add the amine to the amide with stirring, especially when the amide is liquid at ordinary temperatures. In some cases, the application of a little heat may be required to bring the amine into solution in the amide. A typical curing composition was prepared according to the following example:

EXAMPLE I

To a container equipped with means for agitation were added 7 parts by weight of liquid dimethylformamide, and 1 part by weight of normally solid 1-cyanoguanidine. The mixture was then subjected to agitation at a temperature of substantially 25° C. until a homogeneous composition resulted.

Other curing compositions are shown in the following table in which the amounts are given in parts by weight:

Table I

| No. | Parts by Weight | Compound |
|---|---|---|
| 1 | 7 | N,N-diethylacetamide. |
|  | 1 | phenylenediamine. |
| 2 | 3 | N-methylformamide. |
|  | 1 | trihexylamine. |
| 3 | 5 | N,N-dipropylacetamide. |
|  | 1 | 1-cyanoguanidine. |
| 4 | 20 | formamide. |
|  | 1 | propylamine. |
| 5 | 8 | N-ethylformamide. |
|  | 8 | dimethylformamide. |
|  | 1 | diethylamine. |
|  | 1 | phenylenediamine. |
| 6 | 3 | N,N-diethylformamide. |
|  | 2 | N-ethylpropionamide. |
|  | 1 | diethylamine. |
| 7 | 3 | N-propylformamide. |
|  | 1 | N,N-didodecylamine. |
|  | 1 | naphthylamine. |
| 8 | 14 | N,N-dimethylformamide. |
|  | 1 | diethylamine. |
| 9 | 4 | dicyclohexylformamide. |
|  | 1 | eicosylamine. |
| 10 | 9 | N-benzylformamide. |
|  | 1 | 1,2-dimethyl-3,5-diaminobenzene. |
| 11 | 10 | N,N-diphenylformamide. |
|  | 1 | naphthylamine. |
| 12 | 6 | N,N-dicyclohexylpropionamide. |
|  | 1 | tributylamine. |
| 13 | 2 | N,N-dimethylformamide. |
|  | 1 | methylenedianilide. |
| 14 | 11 | N,N-dimethylformamide. |
|  | 1 | diphenylamine. |

Various compositions were prepared containing dimethylformamide and 1-cyanoguanidine in which the ratio of the former-to-the latter were: 16:1, 21:5, 24:5, 5:1, 8:1, 48:5. Other compositions containing dimethylformamide and phenylenediamine were prepared in which the ratio of the former-to-the latter were 5:1, 10:3, 8:3, 5:3, 5:6 and 1:3.

The curing compositions of this invention are employed with various resins to make up compositions which are stable at room temperatures but which, upon curing at elevated temperatures, result in plastic or resinous products having high rigidity and certain other desired properties. An example of a type of resin with which the curing compositions are compounded is the epoxy resins which are glycidyl polyethers of a polyhydric alcohol such as a polyhydric phenol. For example, this type of resin is prepared by reacting a mol of dihydric phenol such as 2,2-bis(4-hydroxyphenyl)propane with one or more mols of epichlorohydrin, in the presence of a base such as sodium hydroxide. These glycidyl ether resins and methods for their preparation are described in various technical publications. Various patents also refer to these epoxy resins and their preparation. Among the patents, for example, are the Castan Patents 2,324,483 and 2,444,333. The product that is obtained may be represented by the formula

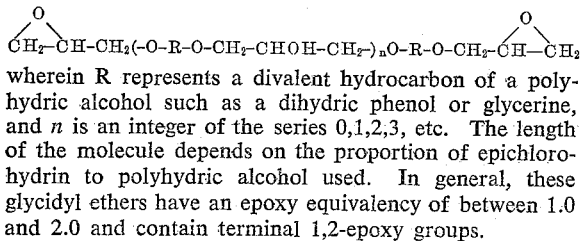

wherein R represents a divalent hydrocarbon of a polyhydric alcohol such as a dihydric phenol or glycerine, and $n$ is an integer of the series 0,1,2,3, etc. The length of the molecule depends on the proportion of epichlorohydrin to polyhydric alcohol used. In general, these glycidyl ethers have an epoxy equivalency of between 1.0 and 2.0 and contain terminal 1,2-epoxy groups.

When the polyhydric alcohols employed in the preparation are dihydric phenols they can be one or a mixture of two or more phenols having from 1 to about 2 aromatic nuclei in the molecule, such as resorcinol, catechol, hydroquinone, ethyl resorcinol, 2,2-bis(4-hydroxyphenyl)propane, bis(4-hydroxyphenyl)methane, bisphenol, 2,2-bis(4-hydroxyphenyl)butane, 1,5-dihydroxynaphthalene, etc. When the polyhydric alcohols employed are aliphatic, they can be alcohols having from 2 to about 20 carbon atoms and from 2 to about 3 hydroxy groups. Nonlimiting examples of such alcohols are 1,2-dihydroxyethane, 1,2,3-trihydroxypropane, 1,2-dihydroxyoctane, 1,3,5-trihydroxydodecane, 1,2-dihydroxyeicosane, etc. When preparing the polyether compounds, one or more of the alcohols can be employed including mixtures of aliphatic alcohols and phenols.

Examples of epihalohydrins which can be employed in the preparation of the polyether compounds are 1,2-epoxy-3-chloropropane, 1,2-epoxy-4-chlorobutane, 1,2-epoxy-8-bromooctane, 2,3-epoxy-5-chlorododecane, 5,6-epoxy-7-bromoeicosane.

In addition to the glycidyl ether compound, the resin may contain other components such as, for example, 1 to 20 weight-percent polyvinyl esters of saturated fatty acids, based on the total weight of the mixture. An example of the latter is polyvinyl acetate. These polyvinyl esters can have various degrees of polymerization within the range of about 50 to 1000 or more and have a ring and ball softening point of from about 30° C. to 100° C.

The resins may also contain from 1 to 500 weight percent of one or more inorganic fillers such as alumina, silica, asbestos, titanium dioxide, zinc oxide, magnesium silicate, mica, calcium carbonate, glass beads, etc. The amount of filler is based on the amount of resin and other polymerizable substances used.

To prepare resin compositions, containing the curing compositions of this invention, the curing composition is simply added to the resin compound and the mixture agitated by stirring or other suitable means until a homogeneous composition is obtained. The curing composition may first be prepared by mixing together the proper proportions of amides and amines and then adding the prepared curing composition to the resin composition. Alternatively, the curing composition components may be added to the resin individually and then the resulting composition agitated by means of shaking, stirring, etc., until it is homogeneous throughout. When adding the curing composition components separately, one may first add the amides and then the amines, or vice versa. When the solubility of the curing composition components in the resin, especially of the amine, is rather slow, heat may be applied to effect a more rapid solution.

The resinous compositions obtained by using the curing compositions of this invention are characterized by very low viscosity and good stability at room temperatures. Upon curing, the resins form very hard substances with adhesive power and are, therefore, useful as insulating films, laminating resins, adhesives, insulators, coatings, etc. The preparation of these curing composition-containing resins is illustrated in the following examples in which the amounts are given in parts by weight.

EXAMPLE II

To a vessel, equipped with means for agitation, were added 100 parts of a glycidyl polyether of a polyhydric alcohol obtained by reacting epichlorohydrin with 1,2,3-trihydroxypropane and having 140–165 grams of resin per 1 gram equivalent of epoxide, and 24 parts of the curing composition of Example I. The mixture was then subjected to agitation by means of stirring until a homogeneous composition resulted having a viscosity of substantially 100 centipoises. The composition was then allowed to stand for 30 days at a temperature of substantially 25° C. No change took place during this period. The curing mixture-containing resin composition was then poured into a glass mold and subjected to a temperature of 120° C. for a period of 12 hours. This treatment caused the composition to set to a hard mass of high cohesive quality which showed no change upon being heated to temperatures of 150° C. for a period of over 40 hours.

Equally good results are obtained when the procedure of Example II is repeated, with other glycidyl ether resins and having between 175 and 4000 gram equivalents of resin per epoxide equivalent. Examples of such other resins are copolymers of bisphenol and 1,2-epoxy-4-chlorobutane, 1,2-dihydroxyethane and 1,2-epoxy-3-chloropropane, 1,2-dihydroxyoctane and 1,2-epoxy-12-bromododecane, etc.

EXAMPLE III

To a vessel equipped with means for agitation are added 100 parts of a polyether resin obtained by reacting 1,2-epoxy-3-chloropropane with 2,2-bis(4-hydroxyphenyl)propane, 4 parts of polyvinyl acetate having a ring and ball softening point of 70° C., 16 parts of dimethylformamide, and 1.5 parts of metaphenylenediamine. The mixture is then thoroughly stirred until a homogeneous solution results. No change is observed in the physical properties of the composition upon allowing it to stand for 1 month at a temperature of about 25° C. The composition is next poured into a glass mold and subjected to a temperature of 150° C. for a period of 16 hours, which causes it is set into a plastic material of high cohesive quality.

EXAMPLE IV

The procedure of Example III is followed in compounding a composition containing 100 parts of glycidyl ether resin obtained by reacting 2,2-bis(4-hydroxyphenyl)propane with epichlorohydrin and having from 175 to 210 grams of resin per epoxide equivalent, 10 parts of dimethylformamide, 20 parts of methylene dianiline, and 150 parts of powdered asbestos. No observable change is evident in the physical properties when the composition is allowed to stand for 4 days. Upon pouring the composition into a glass mold, measuring 8 in. x 2 in. x 2 in., and subjecting it to a temperature of 200° F. for a period of 16 hours, the composition sets into a hard plastic material of high impact strength.

Good results are also obtained when the procedure of Example IV is repeated with 5 parts of the curing composition No. 5 of Table I in place of the dimethylformamide methylenedianiline combination. Likewise, 55 parts of the curing composition No. 8 of Table I in the composition of Example IV gives good results.

EXAMPLE V

To 10 parts of a glycidyl polyether of the type employed in Example III were added 1 part of dimethylformamide and 2 parts of methylene dianiline and the mixture agitated by means of stirring until a homogeneous composition was obtained. The solution had a viscosity of about 100 centipoises which remained substantially the same for a storage period of 3 days at a temperature of substantially 25° C. Upon subjection to a temperature of 93° C. for a period of 16 hours, the composition set into a hard rigid plastic material.

Equally good results are obtained when the curing composition in Example V is replaced with 2 parts of dimethylformamide and 4 parts of metaphenylenediamine.

Examples of other resin compositions employing the curing composition of this invention are given in the following two tables in which the glycidyl ether resin is obtained by copolymerizing 2,2-bis(4-hydroxyphenyl)propane with 1,2-epoxy-3-chloropropane and has a viscosity of approximately 8,000 centipoises at 25° C. and an equivalency of 175 to 210 gram equivalents of resin per epoxide equivalent.

*Table II*
EFFECT OF CURING COMPOSITION ON ETHOXYLINE RESINS

| Components in Parts by Weight | | | Properties After Subjection to Indicated Temperatures for Specified Periods of Time | | | | | | | |
|---|---|---|---|---|---|---|---|---|---|---|
| Glycidyl ether resin | Dimethyl formamide | 1-cyano guanidine | 25° C. | 93° C. | | | 120° C. | | | 150° C. |
| | | | 1 Month | 12 hours | 16–24 hours | 36 hours | 4 hours | 16 hours | 40 hours | 16 hours |
| 100 | 48 | 5 | No change | Set | | Set | Set | | | |
| 100 | 24 | 5 | do | do | | do | do | | Set | |
| 100 | 15 | 3 | do | do | | do | do | | | |
| 100 | 15 | 5 | do | do | | do | do | | | |
| 100 | 35 | 5 | do | do | | do | do | | | |
| 100 | 21 | 3 | do | do | | do | do | | | |
| 100 | 21 | 5 | do | do | | do | do | | | |
| 100 | 8 | 1 | do | | Set | | | Set | | Set. |
| 100 | 16 | 2 | do | | do | | | do | | Do. |
| 100 | 8 | ½ | do | | No set | | | No set | | Do. |
| 100 | 12 | 1 | do | | Set | | | Set | | Do. |
| 100 | 20 | 1 | do | | do | | | do | | Do. |
| 100 | | 6 | No change Catalyst Precipitates out. | | | | | | | |
| 100 | 48 | | No change | No set | | | gel No set | gel No set | | gel |
| 100 | 24 | | do | do | | | | | | do |

*Table III*
EFFECT OF CURING COMPOSITION ON ETHOXYLINE RESINS

| Components in Parts by Weight | | | Properties After Subjection to Indicated Temperatures for Specified Periods of Time | | | |
|---|---|---|---|---|---|---|
| Glycidyl ether resin | Dimethyl formamide | m. phenylene diamine | 25° C., Days before Gel | 93° C., 16 hours | 120° C., 16 hours | 150° C., 16 hours |
| 100 | 16 | 3 | 60 | Set | Set | Set |
| 100 | 16 | 1.5 | 60 | do | do | Do. |
| 100 | 10 | 3 | | do | do | Do. |
| 100 | 16 | 6 | | do | do | Do. |
| 100 | 10 | 12 | <3 | do | do | Do. |
| 100 | 5 | 14.5 | <3 | do | do | Do. |
| 100 | 10 | 6 | | do | do | Do. |
| 100 | 4 | 12 | <2 | do | do | Do. |
| 100 | 2 | 6 | <2 | do | do | Do. |

These tables indicate that stability for periods as long as 60 days is obtained at normal atmospheric temperatures of about 25° C. For instance, from Table III it is seen that, with a combination of dimethylformamide and metaphenylenediamine, storage time as long as 60 days produce no significant change in the physical properties of the glycidyl ether resin. It is also seen that when the amine such as 1-cyanoguanidine is used alone, with no amide present, it settles out upon storage. When, on the other hand, the amide such as dimethylformamide is present with no amine, the resin is not set properly but remains as a gel even after subjecting it to a temperature of 120° C. for a period as long as 40 hours. Thus, it is seen that to have a suitably curable resin, it is necessary that both an amide and an amine be present in the composition.

The resinuous compositions containing the amide-amine curing compositions have the advantage of being stable for long periods of time at room temperatures. This enables the use of resins of low viscosity in manufacturing processes in which it is important that the resin does not begin to set until a certain stage is reached in the manufacturing procedure. For example, in the coating of electrically conducting wires in a wound electrical unit, it is necessary that the resin maintain a very low viscosity until it has penetrated all space surrounding each strand of wire.

The following examples illustrate the use made of resin compositions containing the curing compositions of this invention.

EXAMPLE VI

An electrical coil containing a plurality of turns of copper wire was immersed into a fluid composition of low viscosity of Example IV prior to curing and minus the asbestos filler. The vessel and immersed coil were then placed in a high vacuum apparatus and the air removed, creating a partial vacuum. This served to aid in the removal of air from the wound electrical coil. Air was then admitted to the apparatus enabling the low viscosity resin to penetrate all spaces in between the coils of wire so as to completely cover the whole surface. The electrical coil was removed from the resin solution, placed in an oven and subjected to a temperature of substantially 120° C. for a period of about 12 hours. A thin, hard film was formed on the surface of the copper wire as the resin set at the elevated temperatures. Units insulated with this composition withstand high potentials across the wire and the core of the unit without breakdown.

EXAMPLE VII

The procedure of Example VI was repeated except that the wound unit and the resin composition were first placed in the high vacuum apparatus and the air removed prior to emersion of the electrical unit in the resin. When following this procedure, there is less danger of trapping air in small pockets in the electrical unit and, therefore, facilitates the coating of the entire wire surface.

EXAMPLE VIII

An electrical coil consisting of a plurality of turns of copper wire was immersed in a resin under vacuum as described in Example VII. The resin was contained in a container which was to serve as a casing for the finished unit. The casing, resin, and coil were then placed in an oven and subjected to a temperature of approximately 120° C. for a period of about 12 hours. The resin set into a hard material, forming an encapsulated electrical unit.

While, in the above examples, the use of the curing compositions of this invention has been illustrated in insulating materials for electrical units, there are many other uses which can be made of these curing compositions. For instance, the curing compositions can be used with various resins employed as varnishes, paints, laminating plastics, and the like. In general, these curing compositions may be employed in any epoxy base resin composition which is to be cured at elevated temperatures but which must remain stable at substantially 25° C. for various periods of time.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A heat curable composition comprising a glycidyl ether of a polyhydric organic compound selected from the group consisting of polyhydric alcohols and polyhydric phenols having an epoxide equivalent weight of from about 140 to 210 and a curing composition consisting essentially of (1) an amide having the general formula

wherein Y represents the organic carboxy acid portion of the amide having from 1 to about 4 carbon atoms; $R_1$ and $R_2$ are each selected from the group consisting of hydrogen and alkyl hydrocarbon groups having from 1 to about 12 carbon atoms and hydrocarbon aryl groups free of olefinic unsaturation having up to 12 carbon atoms; and wherein the total number of carbon atoms in the $-NR_1R_2$ part of the molecule is from 0 to about 12, and the total number of carbon atoms in the amide molecule is from 1 to about 15; and (2) a cyanoguanidine having the general formula

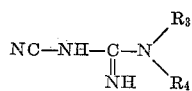

wherein each of $R_3$ and $R_4$ are substituents selected from the class consisting of hydrogen and saturated hydrocarbon groups having up to about 5 carbon atoms, and wherein the ratio in parts by weight of amide-to-said cyanoguanidine is from about 16:1 to about 1:3.

2. A heat curable composition comprising a glycidyl ether of a polyhydric organic compound selected from the group consisting of polyhydric alcohols and polyhydric phenols having an epoxide equivalent weight of from about 140 to 210 and a curing composition consisting essentially of (1) an amide having the general formula $Y-N(CH_3)_2$, wherein Y represents the organic carboxy acid portion of the amide having from 1 to about 4 carbon atoms; and (2) a cyanoguanidine having the general formula

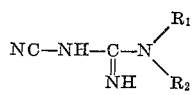

wherein each of $R_1$ and $R_2$ are substituents selected from the class consisting of hydrogen and saturated hydrocarbon groups having up to about 5 carbon atoms, and wherein the ratio in parts by weight of amide-to-said cyanoguanidine is from about 16:1 to about 1:3.

3. A heat curable composition comprising a glycidyl ether of a polyhydric organic compound selected from the group consisting of polyhydric alcohols and polyhydric phenols having an epoxide equivalent weight of from about 140 to 210 and a curing composition consisting essentially of (1) an amide having the general formula

wherein Y represents the organic carboxy acid portion of the amide having from 1 to 4 carbon atoms; $R_1$ and $R_2$ are selected from the group consisting of hydrogen, alkyl hydrocarbon groups having from 1 to about 12 carbon atoms, and hydrocarbon aryl groups free of olefinic unsaturation having up to 12 carbon atoms; and wherein the total number of carbon atoms in the —NR₁R₂ part of the molecule is from 0 to about 12, and the total number of carbon atoms in the amide molecule is from 1 to about 15; and (2) 1-cyanoguanidine, wherein the ratio in parts by weight of amide-to-said 1-cyanoguanidine is from about 16:1 to 1:3.

4. A heat curable composition comprising a glycidyl ether of a polyhydric organic compound selected from the group consisting of polyhydric alcohols and polyhydric phenols having an epoxide equivalent weight of from about 140 to 210 and a curing composition consisting essentially of an amide and an amine wherein the ratio of an amide-to-amine is from about 16:1 to 1:3, and wherein said amide is dimethylformamide and said amine is 1-cyanoguanidine.

5. A heat curable composition comprising a glycidyl ether of a polyhydric organic compound selected from the group consisting of polyhydric alcohols and polyhydric phenols having an epoxide equivalent weight of from about 140 to 210 and a polymerized curing composition consisting essentially of (1) an amide of a monocarboxy organic acid, having from 1 to about 15 carbon atoms and one nitrogen atom and (2) a cyanoguanidine having the general formula

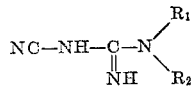

wherein each of R₁ and R₂ are substituents selected from the class consisting of hydrogen and saturated hydrocarbon groups having up to about 5 carbon atoms, and wherein the ratio in parts by weight of amide-to-said cyanoguanidine is from about 16:1 to 1:3.

6. A low-temperature stable resin composition comprising a glycidyl polyether obtained by reacting epihalohydrin with 1,2,3-trihydroxypropane having an epoxy equivalency of substantially 140–165 grams of resin per 1 gram of epoxide, and a curing composition consisting essentially of an amide and an amine in the ratio of substantially 7:1 amide-to-amine, wherein said amide is dimethylformamide and said amine is 1-cyanoguanidine.

7. A heat curable composition comprising a glycidyl ether of a polyhydric organic compound selected from the group consisting of polyhydric alcohols and polyhydric phenols having a 1,2-epoxy equivalency of between 1.0 and 2.0 and having an epoxide equivalent weight of from about 140 to about 210 and a curing composition comprising (a) dimethylformamide and (b) 1-cyanoguanidine wherein the ratio of (a)-to-(b) is substantially 7:1.

8. A heat curable composition comprising a glycidyl ether of a polyhydric organic compound selected from the group consisting of polyhydric alcohols and polyhydric phenols having a 1,2-epoxy equivalency of between 1.0 and 2.0 and having an epoxide equivalent weight of from about 140 to about 210; containing from about 5 to about 55% by weight of a curing composition consisting essentially of an amide of a monocarboxy organic acid having from 1 to about 15 carbon atoms and 1 nitrogen atom, and a syanoguanidine having the general formula

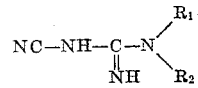

wherein each of R₁ and R₂ are substituents selected from the class consisting of hydrogen and saturated hydrocarbon groups having up to about 5 carbon atoms, and wherein the ratio in parts by weight of amide-to-said cyanoguanidine is from about 16:1 to about 1:3.

References Cited in the file of this patent
UNITED STATES PATENTS

| | | |
|---|---|---|
| 2,285,418 | D'Alelio | June 9, 1942 |
| 2,437,370 | Wilson | Mar. 9, 1948 |
| 2,668,807 | Greenlee | Feb. 9, 1954 |
| 2,712,535 | Fisch | July 5, 1955 |
| 2,893,973 | Steckler et al. | July 7, 1959 |